March 19, 1940.  G. L. ESTOPPEY  2,194,141
SIGHTING DEVICE
Original Filed Dec. 24, 1934   5 Sheets-Sheet 1

Inventor
Georges L. Estoppey
By Marechal & Noe
Attorney

March 19, 1940. G. L. ESTOPPEY 2,194,141
SIGHTING DEVICE
Original Filed Dec. 24, 1934 5 Sheets-Sheet 2

Inventor
Georges L. Estoppey
By Maréchal + Noi
Attorney

March 19, 1940. G. L. ESTOPPEY 2,194,141
SIGHTING DEVICE
Original Filed Dec. 24, 1934 5 Sheets-Sheet 4

Inventor
Georges L. Estoppey
By Maréchal & Noé
Attorney

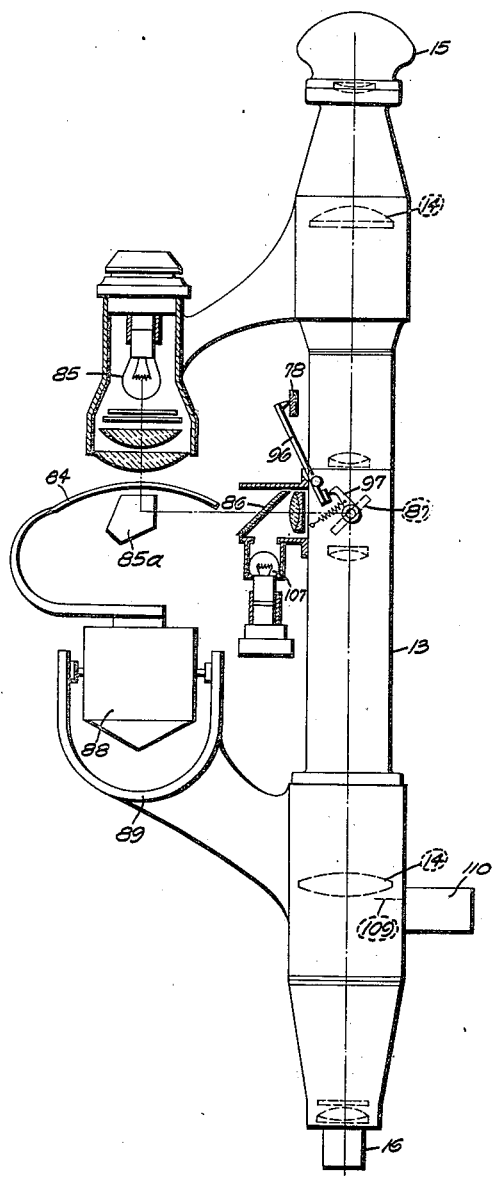

Patented Mar. 19, 1940

2,194,141

UNITED STATES PATENT OFFICE 2,194,141

SIGHTING DEVICE

Georges L. Estoppey, Dayton, Ohio

Application December 24, 1934, Serial No. 758,919
Renewed July 11, 1939

11 Claims. (Cl. 88—1)

This invention relates to sighting devices such as are used on aircraft or other moving carriers and adapted to follow the movements of an objective to determine the proper time for bomb release in order that the bomb may strike the objective.

One object of the invention is the provision of a sighting device of this character having an optical system for following the movements of the objective, a movable reticle being provided for the optical system and provided with stabilizing means such as a gyroscope or the like for automatically controlling the reticle with reference to the bomb sight body.

Another object of the invention is the provision of a bomb sight for aircraft having means for determining the proper time for bomb release and having a reticle which is effective on the eye of the bomber as lines of light in the path of vision of an optical system.

Another object of the invention is the provision of a bomb sight or the like having an optical system provided with a transparent plate on which an image of the reticle is projected, the plate being movable about a transverse axis for relative displacement of the reticle image in the line of vision in accordance with the angle of approach or drift angle.

Another object of the invention is the provision of a sighting device of the character mentioned having indicating means which give an indication as to the amount of time remaining before the proper time of bomb release.

Still another object of the invention is the provision of a bomb sight having an optical system in which the reticle is visible to the eye of the bomber as lines of light, with means for controlling the intensity of the light lines to adapt the reticle illumination for either day or night time bombing.

Other objects and advantages of the invention will be apparent from the following description, the appended claims and the accompanying drawings, in which Fig. 1 is a side elevation of the bomb sight of the present invention, diagrammatically illustrating the various electrical controls and the positioning of the optical system, the gyroscope being shown for purposes of illustration to the rear of the sighting tube;

Fig. 5 is a rear elevation, partly in section, showing the sighting optical system and the stabilized reticle devices.

Figure 1:
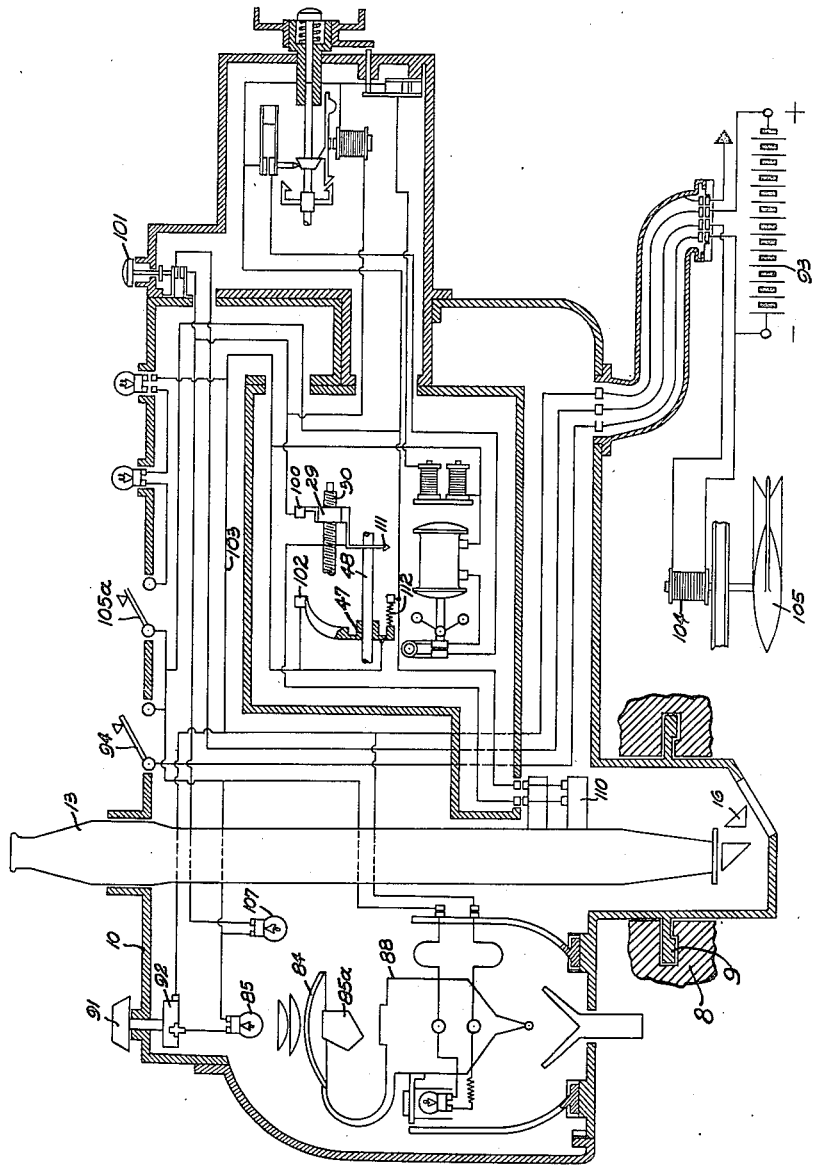

The sighting device of this invention is herein shown as a bomb sight adapted to determine the proper time for releasing a bomb or projectile from an aircraft, but it is to be understood that the invention is susceptible of other uses where there is a relative movement between an objective and the sight and the two are at different elevations. The sight, as shown, embodies a body 10 which may be mounted in a suitable location on an aircraft or the like for horizontal swinging movement about an upright axis 11 in order that the sight body may be turned or swung to maintain the objective in the line of vision in case there is relative angular movement of the objective with reference to the sight, or if a cross wind should be prevailing. Thus the sight body 10 may be rotatably mounted by means of the flange 9 supported in a suitable fixed bearing member 8. In its normal position, in the absence of any cross wind, the direction of the ground speed course is forward toward the target, in the direction of the arrow $a$ shown in Fig. 2. With a cross wind prevailing, or with an objective moving at an angle to the direction of approach, the air direction of movement of the aircraft, and of the bomb sight is indicated by arrow $b$, the sight body having been swung on the axis 11 to maintain the ground course in line with the arrow $a$.

The bomb sight is provided with an optical system adapted to be trained on the objective so as to follow the apparent movements of the objective. This optical system, as shown, comprises a sight tube 13 suitably fixed in the body 10 and having a system of lenses 14, an eye piece 15, and a movable member or prism 16 which is rotatably mounted for movement on a horizontal axis 17, see Fig. 3, in order that the forwardly and downwardly directed line of sight to the objective may be varied as the aircraft travels in the general direction of the objective while the latter is maintained in view.

The tilting or rotational movements of the prism 16 are effected by a parallel link system including links 19 connected to a double armed lever 20 fixed to a gear segment 21, and also pivotally connected to a double armed lever 22 to which the prism 16 is secured. Rotational movements of the segment 21 are effected by a pinion 23 operated by segment 24 which is pivotally mounted on an axis 25 and which is fixed to a synchronizing link 26 extending downwardly and forwardly. The lower end of the link 26 is slotted as indicated at 27, or otherwise slidably related to a pin 28 of a synchronizing slide 29, the latter being in threaded engagement with a rotatable main screw 30. The speed of the screw 30 is so controlled as to produce the required angular movements of the synchronizing link 26 to maintain the objective in the line of vision.

Figure 4:
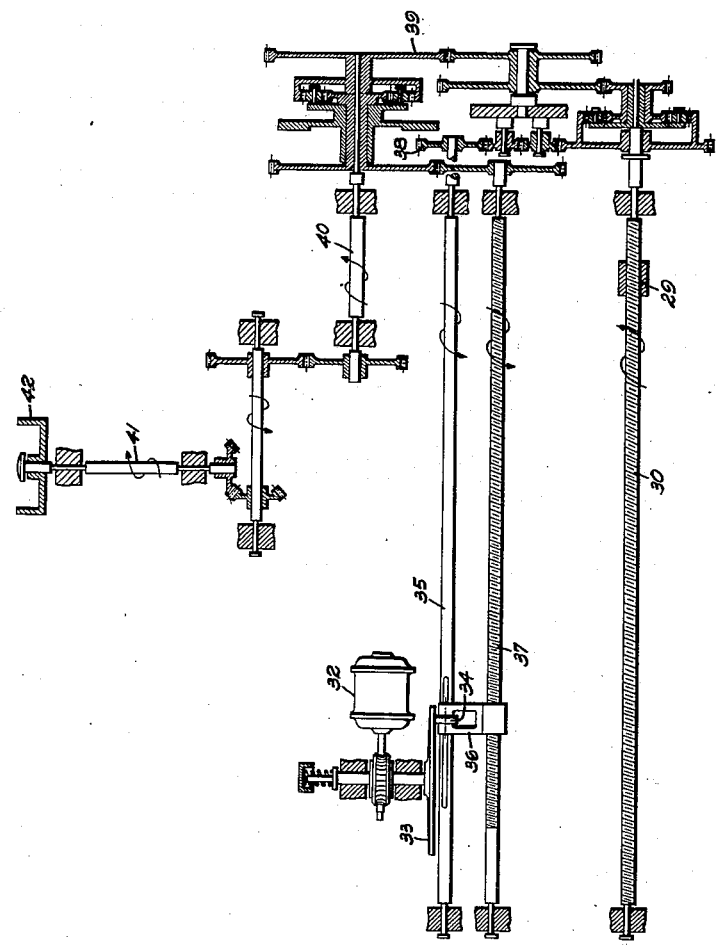
Fig. 4 is a plan view illustrating the driving mechanism for the timing mechanism.

The driving means for the screw 30, as shown in Fig. 4, comprises an electric motor 32 in driving engagement with a friction disk 33. Engaging the disk is a friction wheel 34 keyed on a shaft 35 and rotatably supported in a bracket 36 which is movable under the control of an adjusting screw 37 to bring the friction wheel 34 closer to or further from the center of rotation of the friction disk 33 thus changing the speed of rotation of the shaft 35, the latter being connected to a gear 38 provided in a gear train which differentially connects the shaft 35 to the main shaft 30 so that the speed of the shaft 30 is proportional to the speed of the shaft 35, the differential connection being such, however, that additional movements may be imparted to the shaft 30 by gear system 39 controlled from shafts 40 and 41 and under the operator's control by reason of the adjustable manually controlled knob 42.

This construction is similar to the arrangement set forth in my prior application for United States Letters Patent Serial No. 479,950, filed September 5, 1930, Patent Number 2,118,041, May 24, 1938, the construction providing for a control of the speed of the sighting member by power means under the control of the operator so as to maintain the objective in the line of vision.

Speed adjusting screw 37 is turned by the operator who effects the required turning of knob 42 to position the bracket 36 for increased or decreased speeds. As the bracket 36 moves along screw 37 an adjustable range link 44 is moved angularly about its pivotal connection 45, the lower end of the link 44 being slotted and engaging a pin 46 on the bracket 36. This adjusts the position of the release control slide 47 which is slidably mounted on a rod 48 and which is adapted to cooperate with the synchronizing slide 29 for determining the proper time for bomb release. The point 45 of pivotal connection of the link 44 is vertically adjustable under the control of a screw 50 which is in threaded engagement with the nut 51. The screw 50 may be rotated by a gear train including gears 52 and 55 which are operated by an adjusting knob 56. By turning the knob 56 an altitude trail correction is made in the setting of the nut 51, and at the same time the altitude trail cam 57 is positioned. A drum 54, having a series of altitude scales each for a different terminal velocity is also set as the gear 52 is turned. Surrounding the drum 54 is a shell 54' having index openings each cooperating with one of the altitude scales on the drum 54. The shell 54' is turned in accordance with the particular terminal velocity by means of the knob 53 to which it is fixed. The purpose of the cam 57 is to effect a certain longitudinal adjustment for trail corrections as will be presently described.

Figure 2:
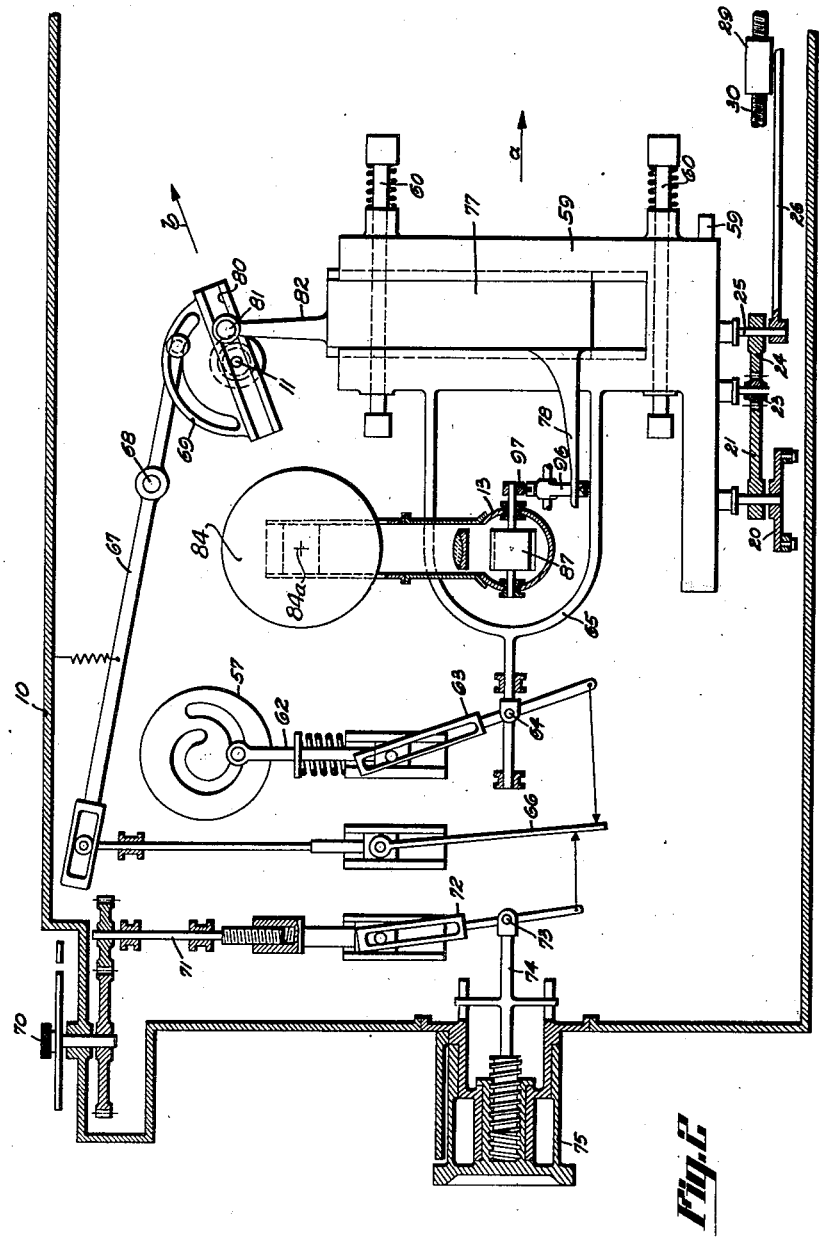
Fig. 2 is a horizontal sectional view illustrating the lateral and longitudinal adjustment means for trail corrections.
Figure 3:
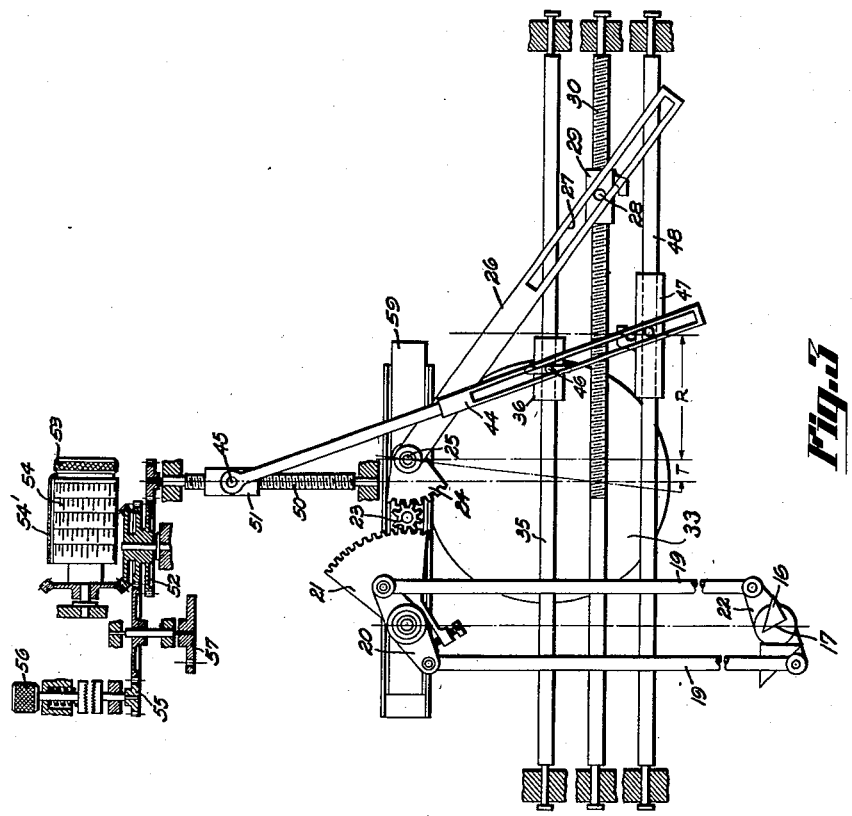
Fig. 3 is a side elevation representing the timing devices for determining the proper time of bomb release.

Referring to Figs. 2 and 3, the gear segments 21 and 24 and the pinion 23 are rotatably mounted on shafts which are provided in a longitudinally adjustable slide 59 which is slidably supported for movement in the direction of the arrow $a$ on supporting bars 60 which are suitably fixed on the bomb sight body 10. The longitudinal or forward adjustment of the slide 59 moves the pivot axis 25 in a forward direction to effect the necessary longitudinal component of the trail correction to control several factors. As shown in Fig. 2, longitudinal adjustment of the slide 59 is effected by the altitude trail correction cam 57 which, when rotated, moves an arm 62 transversely and effects a longitudinal component correction on the slide 59 through the link 63 which is pivotally connected at 64 to the bracket 65 projecting rearwardly from the slide 59. Link 63 is also interlinked with an adjusting link 66 which is movable laterally under the control of an arm 67 pivoted at 68 and movable under the control of a cam 69 which is fixed to the support on which the bomb sight body 10 is pivoted so that as the bomb sight body is turned about its vertical axis the arm 67 is adjusted automatically to effect a longitudinal component of the trail correction in accordance with the drift angle or angle of approach or both. Another longitudinal component of the trail correction is effected by a manually controlled knob 70 which operates an air temperature compensating shaft 71 having a control link 72 which is interlinked with the adjusting arm 66 and also pivotally connected at 73 to an adjustable member 74. The member 74 itself may be moved forwardly under the control of the manually adjustable knob 75 which is adjusted by the bomber in accordance with air speed and terminal velocity of the bomb.

Supported on the slide 59 is a laterally adjustable slide 77 having a rearwardly extending arm 78 which is connected as will be more fully set forth, to the laterally adjustable reticle plate of the optical system. Lateral adjusting movements of the slide 77 are imparted automatically as the bomb sight body is rotated about its vertical axis 11 so as to compensate the reticle in accordance with the drift angle or angle of approach or both. The cam 69 has a straight slot 80 which controls a pin 81 fixed to an arm 82 projecting from the slide 77.

The aircraft cannot always maintain a perfectly horizontal attitude during the bombing operation, and in order that the entire bomb sight would not have to be stabilized by a large, heavy and expensive gyroscope or stabilizing apparatus, the optical system comprises a stabilized reticle, the stabilized part being a small and light member as compared with the entire bomb sight. Thus a very small gyroscope or other stabilizing means may be provided, and the sighting tube 13 may be fixed on the bomb sight and the latter in turn mounted on a vertical axis which is fixed on the aircraft. As shown more fully in Fig. 5, a reference or reticle member 84 comprises an opaque body having transparent cross lines 84a, the body being formed preferably as a spherically curved sheet of glass having a coating of enamel on which two cross scratches are provided, the scratches providing for the passage of light therethrough from a light source or lamp 35. The light passing through the reticle lines of the reticle member 84 is reflected by the prism 85a and passes through the glass plate 86 onto a parallel glass plate 87 provided in the field of vision of the tube 13. The reference member 84 is automatically stabilized by means of a gyroscope or the like indicated at 88 and mounted on a suitable supporting bracket 89 for movement either in a forward or lateral direction so that the reference member 84 will be automatically maintained in a predetermined position with regard to the ground in spite of any tilting movements of the bomb sight body. The reticle itself is apparent to the observer or bomber as he looks through the optical system as crossed lines of light apparent on the parallel plate 87 which is normally inclined at an angle of 45 degrees and which is transparent so that the objective will be apparent through it.

The amount of light produced by the lamp 85, as shown in Fig. 1, is controlled manually by means of an adjusting knob 91 which controls a resistance 92 in series with the battery 93 or other source of energizing power, the power being connected to the lamp 85 when the main switch 94 is closed. The amount of light coming from the lamp 85 is regulated so as to give reticle lines of light, apparent to the bomber, of sufficient brightness for use in daytime bombing, or of sufficiently low intensity for use in night time bombing. Thus the brightness of the reticle will be sufficient for ready observation but not so excessive as to prevent accurate observation of the objective itself.

The reference member 84 as shown in Fig. 5 is provided at one side of the telescope, although for diagrammatic illustration it has been shown in Fig. 1 to the rear of the telescope. The reticle lines thrown on the parallel plate 87 are automatically stabilized, as previously described, and means are also provided for moving the image of the reticle laterally with respect to the line of vision through the sighting tube 13, the lateral adjustment of the reticle being effected automatically in accordance with the amount of angular movement of the bomb sight body on its vertical axis 11 from a normal position. As the bomb sight body is adjusted on its vertical axis, as will be apparent from Fig. 2, the arm 78 on the laterally adjustable slide 77 is moved laterally, and its lateral movements are imparted by means of a pivoted arm 96, see Fig. 5, to an arm 97 which is fixed to the parallel plate 87, the latter being rotatably mounted on a transverse horizontal axis so that the angle of tilt of the parallel plate may be adjusted. Adjusting movements of the parallel plate 87 on its horizontal axis have the effect of moving the reticle image laterally so as to give the proper inclination of the line of sight to the objective to compensate for cross winds or for relative angular movement of the objective with reference to the ground speed course.

At the exact time of bomb release, a contact is automatically closed by the synchronizing slide 29, which is illustrated in Fig. 1 together with a portion of the screw 30 with which it is in threaded engagement. The slide 29 carries a contact 100 which is connected to the bomb release magnet when the safety bomb release switch 101 is closed. The connection is from the upper side of the release magnet 104 through the closed switch 101 and directly to the contact 100, the other side of the magnet 104 being connected to the negative side of the batteries 93 as indicated in Fig. 1. When the contact 100 engages a second contact 102 provided on the slide 47 of rod 48, contact is made through the line 103 to one side of the battery 93, that is the positive side, as indicated in Fig. 1, thus energizing the release winding 104 which effects the release of the bomb 105. When the contacts 100 and 102 engage and effect the release of the bomb, the switches 94 and 105a having been closed, a circuit is energized through a signal lamp 107 which is illuminated. One side of the signal lamp 107 is connected directly to the contact 100 so that when contacts 100 and 102 engage that side is connected to the positive side of the battery through wire 103. The other side of the lamp 107 is connected through the closed switch 94 directly to the negative side of the battery. This lamp 107 as shown in Fig. 5 throws light on the transparent plate 86 which reflects the light onto the parallel plate 87, illuminating an area on the plate, and thus giving an indication to the bomber that the bomb is gone and that he need no longer continue to follow the movements of the objective on the optical system. As a further aid to the bomber, and to keep the bomber fully informed as to how much time remains before the bomb is to be dropped, an indicator needle 109 of a volt meter or milli-ammeter 110 is visible to the bomber, the end of the needle swinging in an arc at one side of the center line of sight. The instrument 110 has one end connected to a movable contact 111 provided on slide 29. The other end of the instrument is connected to the slide 47. Well before contacts 100 and 102 engage, and before contact 111 engages with the slide 47, no indication of the needle 109 is given, the needle thus being in its normal position. However, as the time for release of the bomb approaches, and before the time for release is at hand, the contact 111 engages and moves along a resistance or potentiometer 112 which is connected at one end to the line 103 and thus to the positive side of the battery. The other side of the battery is connected through the closed switch 94 to the other end of the resistance 112 and to one side of the instrument 110. The voltage applied to the instrument 110 is thus dependent on the position of the contact 111 upon the potentiometer 112. As soon as the contact 111 engages the right-hand end of the resistance 112, see Fig. 1, the needle swings over to its full extent and thus indicates to the bomber that the time for bomb release is getting rather close. As the contact 111 moves to the left along the resistance 112 the needle gradually returns to its normal position, and its amount of deflection from its normal position forms an indication as to the amount of time still remaining before the proper time of bomb release. The bomber is thus enabled to accurately control the instrument to maintain the objective more accurately in the line of vision during the last portion of the synchronizing operation. As above mentioned, when the time for bomb release is at hand, the bomb is automatically released and an area on the parallel plate 87 is illuminated, telling the bomber that the bomb is gone. However, it will be noted particularly that this illumination of an area on the plate 87 does not take place before the bomb goes, and thus does not disturb the bomber's synchronizing operations.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a sighting device of the character described, an optical system mounted thereon for sighting a target and having a movable element for keeping the target in the line of vision, a reticle for said optical system, means for stabilizing said reticle with reference to the ground as the sighting device is tilted, means for rotatably supporting said sighting device on a vertical axis, and a second movable element having transparent property and reflecting property and mounted in the optical system between the first movable element and the eye location of the observer and reflecting the reticle to the eye of the observer, said second element being movable independently of the first element to produce an apparent lateral motion of the reticle with reference to the ground speed course to incline the line of sight in accordance with the rotational movements of the sighting device about said vertical axis to compensate for drift angle and angle of approach.

2. In an aircraft bomb sighting device, a body mounted for turning movement on a vertical axis fixed on the aircraft, a sighting tube vertically positioned on said body and having a movable portion rotatable about a horizontal axis fixed on said body for keeping the target in the line of vision, a reticle for said sighting tube, gyroscopic means for stabilizing said reticle in said body with reference to the ground as the sighting device is tilted, and additional means provided between said movable portion and the eye of the observer for automatically producing an apparent motion of the reticle laterally in the sighting tube and with reference to the ground speed course to incline the line of sight in accordance with the angle of turn of said body about said vertical axis to compensate for drift angle and angle of approach.

3. In a sighting device of the character described, an opaque reference member having crossing transparent reticle lines and movably supported for movement about a plurality of horizontal axes on the sighting device, stabilizing means for maintaining said member in predetermined position with reference to the ground as the sighting device is tilted, a sighting tube mounted on said sighting device having a movable sighting member for following an objective and having a transparent plate in the path of vision of said sighting tube, means supporting said sighting device for rotational movement about a vertical axis, means for rotatably adjusting said transparent plate about a horizontal axis, and a light source fixed with respect to said sighting tube and cooperating with said reference member for projecting the reticle lines as crossing lines of light on said plate.

4. In a sighting device of the character described, a body mounted for turning movement on a fixed vertical axis, an optical sighting system comprising a sighting tube vertically positioned on said body and having a movable portion rotatably mounted on a horizontal axis for keeping the target in the line of vision, a transparent plate, means pivotally supporting said plate for movement about a horizontal axis, an opaque reference member having transparent reticle lines, a light source cooperatively associated with said reference member for projecting the reticle lines as lines of light onto said transparent plate in the path of vision of said optical system, means for adjusting said plate about its horizontal axis for trail correction, and means for stabilizing said reference member in a predetermined normal position.

5. In a sighting device of the character described, a reference member having reticle lines and movably supported on the sighting device, stabilizing means for maintaining said member in a predetermined position with reference to the ground as the sighting device is tilted, an optical system mounted on said sighting device and having a transparent inclined plate in the path of vision of said optical system, said optical system having a movable portion rotatably mounted on a horizontal axis for keeping the target in the line of vision, a light source cooperatively associated with said reference member for projecting the reticle lines as a visible image on said plate, means supporting said plate for movement about a horizontal laterally extending axis on the sighting device, means rotatably supporting said sighting device for movement about a vertical axis, and means for moving said plate on its axis in accordance with rotational movements of the sighting device about said vertical axis.

6. In an aircraft bomb sighting device, a body mounted for turning movement on a fixed vertical axis, an optical sighting system comprising a sighting tube positioned on said body and having a movable portion rotatably mounted on a horizontal axis for keeping the target in the line of vision, an opaque reference member having transparent reticle lines, means for stabilizing said reference member, a transparent plate provided in the field of vision of the optical system, a light source cooperatively associated with said reference member for projecting the reticle lines as lines of light on said plate and in the path of vision of said optical system, and means for moving said plate on a horizontal laterally extending axis in accordance with drift angle and angle of approach.

7. In an aircraft bomb sighting device, a body, an optical system positioned on said body and having a movable portion rotatably mounted for keeping the target in the line of vision, an instrument pointer movable in the line of vision of the optical system to the same predetermined position to indicate the proper time for bomb release at various altitudes, means for moving the pointer to some displaced position at some predetermined time in the bombing operation before the proper time for bomb release, and means for automatically moving said pointer gradually to said predetermined position in accordance with the time interval existent before the proper time for bomb release including means for determining its rate of movement in accordance with altitude of the aircraft.

8. In an aircraft bomb sighting device, a body mounted for turning movements on fixed vertical axis, an optical system comprising a sighting tube positioned on said body and having a movable portion rotatably mounted on a horizontal axis for keeping the target in the line of vision, a reticle for said optical system, means for stabilizing said reticle with reference to the body, an instrument pointer movable in the line of vision of the optical system to the same predetermined position to indicate the proper time for bomb release at various altitudes, means for moving the pointer to some displaced position at some predetermined time in the bombing operation before the proper time for bomb release, and means for automatically moving said pointer gradually to said predetermined position in accordance with the time interval existent before the proper time for bomb release including means for determining its rate of movement in accordance with altitude of the aircraft.

9. In a sighting device of the character described, a body mounted for turning movement on a fixed vertical axis, an optical sighting system comprising a sighting member positioned on said body and having a movable portion rotatably mounted for keeping the target in the line of vision, bomb releasing means, an opaque reference member having transparent reticle lines, a transparent plate in the line of vision, a light source fixed on said body for illuminating said reticle lines and projecting the same as visible lines of light on said transparent plate, means for electrically controlling the power supplied to the light source for controlling the intensity of illumination of said light source, an additional light source for producing a bright area of illumination on said transparent plate in the path of vision of the optical system, and means automatically operable by said bomb releasing means for automatically energizing the additional light source when the bomb is released.

10. In a sighting device of the character described, an optical system mounted thereon for sighting a target and having a movable element for keeping the target in the line of vision, a reticle for said optical system, gyroscopic means for stabilizing said reticle with reference to the ground as the sighting device is tilted, means for rotatably supporting said sighting device on a vertical axis, and a second movable element interposed in the line of sight in series with the first element and movable independently of the first element in accordance with the rotatable movements of the sighting device on said vertical axis to produce an apparent lateral motion of the reticle with reference to the ground speed course.

11. In an aircraft bomb sighting device, a body mounted for turning movement on a vertical axis fixed on the aircraft, an optical system arranged in said body for sighting a target and having a movable element for keeping the target in the line of vision, a reticle for said optical system, gyroscopic means for stabilizing said reticle with reference to the ground as the body is tilted by tilting movement of the aircraft, and means interposed in said optical system between the movable element and the eye location of the observer and movable independently of the element in a lateral direction to incline the line of sight by producing an apparent lateral motion of the reticle with reference to the ground speed course, and mechanism for operating said last means in accordance with the amount of rotation of the body on its vertical axis.

GEORGES L. ESTOPPEY.